Patented Apr. 11, 1933

1,903,614

UNITED STATES PATENT OFFICE

GEORGE M. KARNS AND LEONARD H. CRETCHER, OF PITTSBURGH, PENNSYLVANIA, ASSIGNORS TO IODINE EDUCATIONAL BUREAU, INC., A CORPORATION OF NEW YORK

DISINFECTING SOLUTION

No Drawing.   Application filed December 15, 1930. Serial No. 502,620.

This invention relates to disinfecting solutions, and, specifically, to aqueous solutions of free iodine. The usual aqueous iodine solution is a solution of free iodine in a solvent which itself is an aqueous solution of potassium iodide. This usual iodine solution is irritating to living tissue, and is on that account objectionable and may not be used in cases of delicacy. The iodine solution of this invention, while no less effective for disinfecting purposes than the usual solution, is less irritating than the usual iodine solution, and accordingly its usefulness is far greater.

The physiological effects of solutions of metallic salts upon living animal tissue have been studied, and it has been discovered that these solutions are congenial to living tissue, and that life tends to continue (when the tissue is immersed in the solution), to the extent that the metallic ions of the solution are identical with the metallic ions of the blood serum of the animal. That is to say, the metallic ions of animal blood serum having been discovered to be (approximately) sodium 92%, potassium 4.5% and calcium 2.7%, with other metalic ions present in quantities less than 1%, it has been found that a solution of sodium chloride is congenial to the life of animal tissue, as a solution of potassium chloride is not; and that, if a solution be prepared of sodium chloride, potassium chloride, and calcium chloride, in which the three said salts are present in the approximate ratio of 920:45:27, then a solution most congenial to the life of such tissue is attained. Solutions of such character have value and are employed as perfusion media in conducting certain physiological experiments. This invention lies in the discovery that, if the solvent used for free iodine in the preparation of a disinfecting solution be selected and prepared according to and in realization of the general principle stated above with respect to congeniality of solutions to living tissue, irritating effects may be avoided.

The invention consists in a solution of iodine in a solvent which itself is a solution of metallic iodide, and the solution of metallic iodide is one whose metallic ions are substantially identical with those of blood serum. The invention is realized in less complete degree in a solution of iodine in which the solvent is an aqueous solution of sodium iodide; it is more perfectly realized if the solvent be a solution of sodium iodide, potassium iodide, and calcium iodide, associated in relative quantities such that the metallic ions of the solution are more completely identical with those of blood serum. In any case, the metallic component of the iodide in solution corresponds in composition to the metallic component of the human blood serum to a degree that, when the total metallic content of the blood is considered as being 100%, no single metallic constituent contained in the solvent varies more than 10% from the percentage of that metallic constituent in the serum of the human blood.

To prepare a solution embodying our invention in most complete and best form known to us, we use iodine and anhydrous salts or their equivalent in the following ratio:

Sodium iodide_____ 1.104
Potassium iodide_____ .048
Calcium iodide_____ .032
Iodine_____ 1.000

Antiseptic solutions of varying strengths can be made of salts and iodine in the above proportion, up to concentrations in which the solution is saturated with one of the constituents. If it is so desired for special purposes, the salts may be used in the above ratio with free iodine concentrations differing from that specified in the ratio. By this modification a salt solution having salts in the above ratio may be made having a desired osmotic concentration (as for example, to be isotonic with blood serum) and the iodine concentration may be varied within the range of solubility of iodine in the salt solution.

We claim as our invention:
1. A disinfecting solution of free iodine in a solvent which is itself an aqueous solution of metallic iodides, the metallic components of which salts correspond to the metallic component of human blood serum to a degree that when the total metallic content of the blood is considered as being 100%, no single metallic constituent contained in the solution varies in amount more than 10% from the percentage of that metallic constituent in the serum of the human blood.

2. A disinfecting solution of free iodine in a solvent which itself is an aqueous solution of sodium iodide, potassium iodide, and calcium iodide, in substantially the ratio of 1104:48:32.

3. A disinfecting material consisting of an aqueous solution of substantially sodium iodide, 1104 parts; potassium iodide, 48 parts; calcium iodide, 32 parts; and iodine, 1000 parts.

In testimony whereof we have hereunto set our hands.

GEORGE M. KARNS.
LEONARD H. CRETCHER.